(12) United States Patent
Abraham et al.

(10) Patent No.: US 11,620,842 B2
(45) Date of Patent: *Apr. 4, 2023

(54) AUTOMATED DATA EXTRACTION AND DOCUMENT GENERATION

(71) Applicant: IAA, Inc., Westchester, IL (US)

(72) Inventors: Maju Abraham, Westchester, IL (US); Subbu Viswanathan, Westchester, IL (US); Ryan Fagan, Westchester, IL (US); Ashish Kashyap, Naperville, IL (US); Anurag Sharma, Buffalo Grove, IL (US); Mark Oost, Delfgauw (NL); Michael T. Cornelison, LaGrange Highlands, IL (US)

(73) Assignee: IAA, Inc., Westchester, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/582,892

(22) Filed: Jan. 24, 2022

(65) Prior Publication Data
US 2023/0058570 A1    Feb. 23, 2023

Related U.S. Application Data

(63) Continuation of application No. 17/405,427, filed on Aug. 18, 2021, now Pat. No. 11,232,298.

(51) Int. Cl.
*G06K 9/62* (2022.01)
*G06V 30/413* (2022.01)
(Continued)

(52) U.S. Cl.
CPC ......... *G06V 30/413* (2022.01); *G06K 9/6201* (2013.01); *G06K 9/6256* (2013.01);
(Continued)

(58) Field of Classification Search
CPC ...... G06V 30/413; G06V 10/30; G06V 10/40; G06V 30/347; G06K 9/6201;
(Continued)

(56) References Cited

U.S. PATENT DOCUMENTS 6,212,504 B1   4/2001 Hayosh
10,818,042 B1   10/2020 Tang et al.
(Continued)

OTHER PUBLICATIONS

Microsoft, "What is Azure Form Recognizer?"—Azure Applied AI Services, Microsoft Docs, Mar. 15, 2021, retrieved from Internet: https://docs.microsoft.com/en-us/azure/cognitive-services/form-recognizer/overview?tabs=v2-1 on Jun. 10, 2021, 9 pages.

*Primary Examiner* — Samir A Ahmed
(74) *Attorney, Agent, or Firm* — Leydig, Voit & Mayer, Ltd.

(57) ABSTRACT

A computer-implemented method of generating electronic documents is described. The method comprises receiving a plurality of scanned documents for a plurality of vehicles; providing the plurality of scanned documents to a neural network model that outputs respective class identifiers of the plurality of scanned documents; for each scanned document of the plurality of scanned documents, extracting data from the scanned document according to a corresponding class identifier, and associating the scanned document and the extracted data with an identified vehicle of the plurality of vehicles, wherein the identified vehicle is identified by the extracted data; and generating an electronic document for the identified vehicle using the extracted data.

11 Claims, 6 Drawing Sheets

(51) Int. Cl.
*G06T 3/60* (2006.01)
*G06T 5/00* (2006.01)
*G06N 3/08* (2023.01)
*G06V 10/30* (2022.01)
*G06V 10/40* (2022.01)
*G06V 30/32* (2022.01)
*G06Q 40/08* (2012.01)

(52) U.S. Cl.
CPC ............... *G06N 3/08* (2013.01); *G06Q 40/08* (2013.01); *G06T 3/60* (2013.01); *G06T 5/002* (2013.01); *G06V 10/30* (2022.01); *G06V 10/40* (2022.01); *G06V 30/347* (2022.01); *G06T 2207/20081* (2013.01); *G06T 2207/20084* (2013.01); *G06T 2207/30176* (2013.01)

(58) Field of Classification Search
CPC ........ G06K 9/6256; G06N 3/08; G06Q 40/60; G06T 3/60; G06T 5/002; G06T 2207/20081; G06T 2207/20084; G06T 2207/30176

See application file for complete search history.

(56) References Cited

U.S. PATENT DOCUMENTS

| | | | |
|---|---|---|---|
| 10,831,704 | B1 | 11/2020 | Sanchez et al. |
| 11,232,298 | B1* | 1/2022 | Abraham ................ G06T 5/002 |
| 2014/0032430 | A1 | 1/2014 | Sieger |
| 2014/0279868 | A1 | 9/2014 | Astorg |
| 2015/0266330 | A1 | 9/2015 | Peinze |
| 2017/0236229 | A1 | 8/2017 | Roof |
| 2018/0046649 | A1 | 2/2018 | Dal Mutto et al. |
| 2018/0322414 | A1 | 11/2018 | Jayaraman |
| 2019/0340428 | A1 | 11/2019 | Wickett et al. |
| 2020/0226646 | A1 | 7/2020 | Awoyemi et al. |
| 2021/0312568 | A1 | 10/2021 | Alami et al. |

* cited by examiner

AUTOMATED DATA EXTRACTION AND DOCUMENT GENERATION

CROSS-REFERENCE TO RELATED APPLICATIONS

This patent application is a continuation of copending U.S. patent application Ser. No. 17/405,427, filed Aug. 18, 2021, issued as U.S. Pat. No. 11,232,298, the disclosure of which is hereby incorporated by reference in its entirety.

FIELD OF THE DISCLOSURE

The present disclosure relates generally to document intake systems, more particularly, to a document categorization and extraction system.

BACKGROUND

When a vehicle is damaged or "totaled," a user of the vehicle may make an insurance claim to an insurance provider with which the user has insured the vehicle. In some scenarios, the user may wish to transfer their ownership interest in the vehicle to the insurance provider in exchange for a payout settlement. The insurance company may then sell the vehicle to a third party, such as an auction service. In some scenarios, the third party may assist in processing the settlement and may need many documents to verify an identity of the vehicle (i.e., a vehicle identifier number), establish a monetary value of the vehicle, confirm ownership or a chain of title for the vehicle, determine whether a party seeking the settlement has legal authority to request the settlement, etc. Traditionally, the third party would receive the needed documents by mail or fax and the information on the documents would be manually reviewed for completeness and accuracy before further processing of the settlement. Information within the documents may then be referred to when finalizing the settlement, for example, when sending requests for more information, requests for corrections, etc.

Manual review of the documents and also locating documents when needed are very time consuming processes, so some third parties enter the information from received documents into a computer system. In some scenarios, documents are manually scanned, the data is then manually entered into the computer system, then a user must determine, based on the available data and documents, whether any data is incorrect or missing. When documents or data are missing, the user must manually determine next steps for obtaining them. Verification of the information is technically challenging when the documents include handwritten information, include text boxes that have irregular shapes, or have entirely different formats depending on local regulations (e.g., local government documents for title transfers that differ by state). Moreover, different workflows for obtaining documents may be needed in different states, which further complicates the settlement process.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

In an embodiment, a computer-implemented method of generating electronic documents is described. The method comprises receiving a plurality of scanned documents for a plurality of vehicles; providing the plurality of scanned documents to a neural network model that outputs respective class identifiers of the plurality of scanned documents; for each scanned document of the plurality of scanned documents, extracting data from the scanned document according to a corresponding class identifier, and associating the scanned document and the extracted data with an identified vehicle of the plurality of vehicles, wherein the identified vehicle is identified by the extracted data; and generating an electronic document for the identified vehicle using the extracted data.

In another embodiment, a document intake system is described. The document intake system comprises a processor, a neural network model, and a memory storing computer-executable instructions that when executed by the processor cause the system to: receive a plurality of scanned documents for a plurality of vehicles; provide the plurality of scanned documents to a neural network model that outputs respective class identifiers of the plurality of scanned documents; for each scanned document of the plurality of scanned documents, extract data from the scanned document according to a corresponding class identifier, and associate the scanned document and the extracted data with an identified vehicle of the plurality of vehicles, wherein the identified vehicle is identified by the extracted data; and generate an electronic document for the identified vehicle using the extracted data.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the invention, needs satisfied thereby, and the objects, features, and advantages thereof, reference now is made to the following description taken in connection with the accompanying drawings.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described herein generally relate to a document categorization and extraction system that automatically classifies scanned documents that are received, extracts data from the classified documents, associates the scanned documents and extracted data with a vehicle identified by the extracted data, and generates an electronic document for the identified vehicle using the extracted data. A neural network model is utilized to classify the documents and provides a class identifier for each scanned document. Data is extracted from the scanned document according to the class identifier. Since the data extraction occurs after classification of the scanned document, a faster and more accurate extraction routine that is specific to a particular document class may be utilized. In the case of scanned documents that are not successfully classified, the neural network model is retrained using the unsuccessful documents after further processing.

As documents are received and processed, automatic routines identify incorrect data or missing data and determine an appropriate workflow for further processing. In some embodiments, data that has been extracted is compared with existing data in the system to identify discrepancies or errors in the intake and automatically correct them. Example workflows may include sending a request for further information, a request for corrections of data, or advancing to a next step in the business process. When the workflows require transmission of a new document, the system automatically generates the new document using the extracted data.

These and other techniques described herein allow accurate and efficient intake of documents for various business processes, such as payout settlements, document intake verification or other suitable processes. Such automatic intake may, for example, reduce errors in generated documents and reduce delays in the business process due to missing data or steps that are manually performed. Such automatic intake may be of particular importance in catastrophe situations in which many vehicles may be damaged in a short span of time, for example due to fires, floods, tornadoes, hurricanes, etc. and many documents are received in a short period of time for hundreds of vehicles. Such automatic work assignment may also be advantageous in the absence of catastrophic events.

Figure 1:
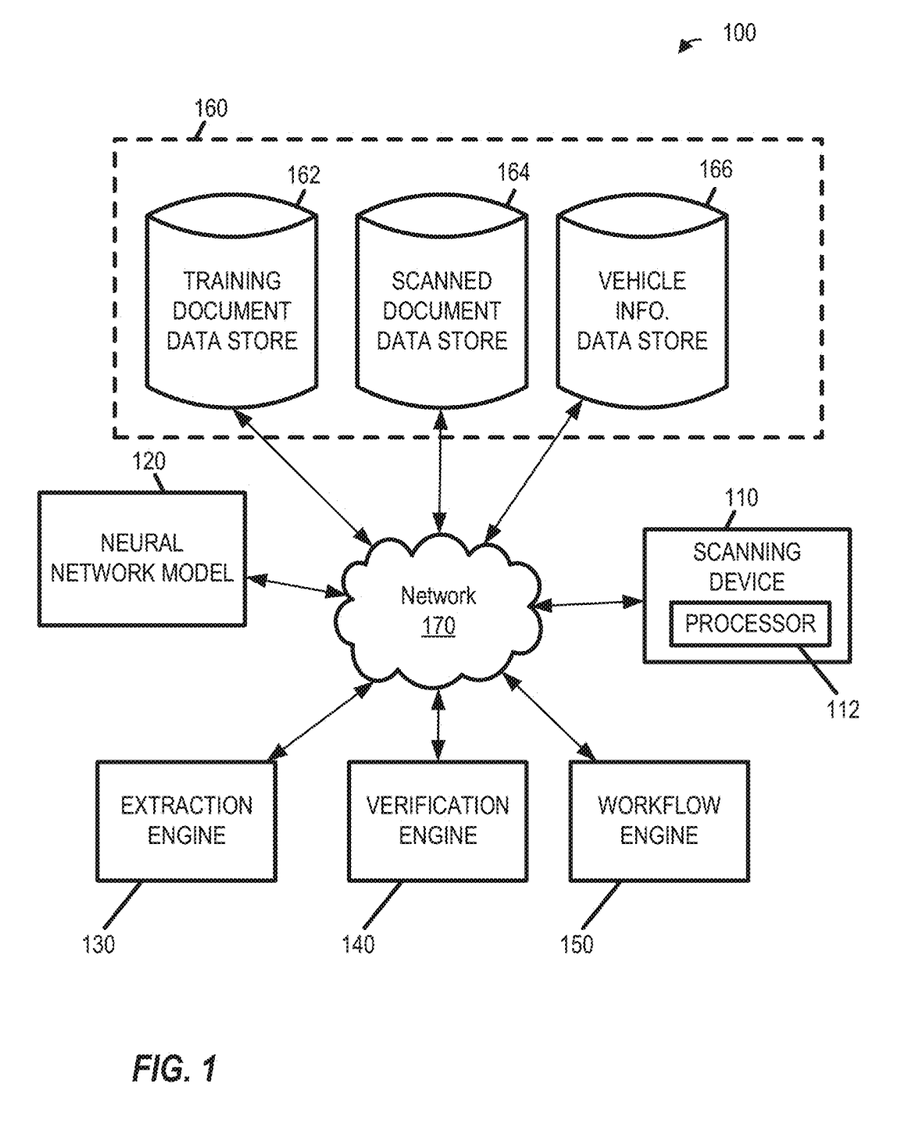
FIG. 1 is a block diagram of a document categorization and extraction system in which document intake techniques described herein may be utilized, according to an embodiment.

FIG. 1 is a block diagram of a document categorization and extraction system 100 ("system 100") in which document intake techniques described herein may be utilized, according to an embodiment. The system 100 may include a scanning device 110, a neural network model 120, an extraction engine 130, a verification engine 140, a workflow engine 150, and one or more data stores 160, which may be communicatively coupled via a communication network 170. The communication network 170 may be a wide area network (WAN) such as the Internet, a local area network (LAN), or any other suitable type of communication network. In some embodiments, communication network 170 may be a single communication network or may be made up of multiple different communication networks.

The scanning device 110 generally includes a scanner or other suitable image capture device configured to analyze a paper document and generate a scanned document (i.e., an electronic document). The scanning device 110 is configured to generate the scanned document to have a file format that is readable by the neural network model 120. In some embodiments, the scanning device 110 is a single device (i.e., a document scanner, camera, image sensor) that outputs a portable document format (PDF) file, an image file such as a JPEG, PNG, or TIFF image, or other suitable file formats. In other embodiments, the scanning device 110 includes i) a document scanner, camera, or image sensor that initially scans the paper document and generates a first electronic document, and ii) one or more processors 112 that convert the first electronic document into the scanned document that is readable by the neural network model 120. In an embodiment, for example, the document scanner generates a PDF file and the processor 112 converts the PDF file to a JPEG file that is readable by the neural network model 120.

The processors 112 of the scanning device 110 may also perform other "pre-processing" steps or image augmentation processes. In an embodiment, the processor 112 performs a realignment process that corrects an angular orientation of an image, for example, to de-skew a document that was not aligned properly when scanned. In some embodiments, the processor 112 performs a noise reduction process that corrects noise within an image. For example, the processor 112 may despeckle an image to remove spots or other image artifacts, remove lines, correct color imbalances, or other suitable processes. In some embodiments, the processor 112 resizes an image by one or more of scaling, cropping, resampling, or other suitable process.

The neural network model 120 is configured to take a scanned document from the scanning device 110 and output a class identifier that indicates a structure of the scanned document. For example, scanned documents of a same document type generally have similar locations for fields in which data may be entered, for example, text fields, numerical fields, signature fields, etc. In various embodiments, the neural network model 120 may be implemented as a program module or application (e.g., on computer system 200, FIG. 2), as a separate server or computing device that uses neural network processors, or as a standalone service hosted by a third party (e.g., a cloud-based service such as Microsoft Azure Cognitive Services).

The class identifier may be an integer (e.g., an index), a data structure, a memory address, a memory pointer, or other suitable identifier that indicates the structure of the scanned document. The class identifier may indicate one or more fields that are present in the scanned document, what types of data are associated with the fields (e.g., alphanumeric, signature, checkbox, date), and where those fields are located within the scanned document (e.g., x-y coordinates). Example document types include a vehicle title document (e.g., vehicle title document 300, FIG. 3A), a lien release document (e.g., lien release document 350, FIG. 3B), a power of attorney document (e.g., power of attorney document 450, FIG. 4), an odometer disclosure document, or other suitable document types. In some embodiments, the document types correspond to different forms with standardized formats and generally consistent locations of the fields (e.g., vehicle title document 300, power of attorney document 450). In some embodiments, the document types may correspond to similar, but non-standardized documents, such as letters (i.e., lien release document 350) or other documents where the fields may be located differently depending on content within the document. For example, a letter may include fields that are of variable length (e.g., a person's name or a vehicle model) which causes subsequent fields to be placed in different locations, different lines, etc.

Although the examples of document types described herein are specific to a vehicle payout settlement process, other document types may be utilized in other embodiments where data is extracted from scanned documents.

The neural network model 120 is trained to identify the class identifier using a plurality of training documents. Generally, the neural network model 120 is trained using a different plurality of training documents for each document type that is to be identified, for example, a first plurality of documents for a first document type, a second plurality of documents for a second type, etc. In some scenarios, the neural network model 120 is trained for one document type at a time. In other scenarios, the neural network model 120 is trained for several document types concurrently, for example, using a random or pseudo-random order of documents selected from the first and second pluralities of documents, etc.

In some scenarios, the neural network model 120 may be unable to reliably identify a class identifier for a scanned document (i.e., an "unclassifiable document"). For example, a scanned document may contain artifacts or aberrations that prevent an accurate classification of the document. In an embodiment, the neural network model 120 outputs a class identifier having a predetermined value that indicates the unclassifiable status, for example, an integer value of 0, 255, or other suitable value. In some embodiments, the neural network model 120 outputs a confidence level corresponding to a likelihood of an accurate classification. The confidence level may be an integer (e.g., 1 for unlikely to 10 for highly likely), a floating point number (e.g., 0.0 for unlikely, 1.0 for highly likely), a percentage (e.g., 0% for unlikely to 100% for highly likely), or other suitable range of values. In some embodiments, the neural network model 120 outputs both the class identifier and the confidence level as a pair, for example, (Document Type 0, 87%), (Document Type 3, 65%), Document Type 255, 0%).

The extraction engine 130 is configured to extract data from scanned documents according to the class identifier from the neural network model 120. In some embodiments, the extraction engine 130 is implemented as an application module that is stored in a non-transitory memory and executed by a processor. In other embodiments, the extraction engine 130 is implemented as an application specific integrated circuit. The extraction engine 130 may utilize optical character recognition and/or related techniques to capture typed, handwritten or printed text within various fields of the electronic document and generate corresponding data as a character string (e.g., for a VIN or name), integer (e.g., for a model year or date), floating point number (e.g., for tax or monetary value), image (e.g., for a signature), or other suitable data format. In some scenarios, the fields within the electronic document are spread over multiple lines or different locations within the electronic document. The extraction engine 130 is configured to identify fields that are spread out and concatenate or otherwise combine the extracted data into a single field.

In some embodiments, the extraction engine 130 extracts the data from the scanned document as key/value pairs, such as a key pair identifier (KPI) and a value. In some embodiments, the number of KPIs and corresponding values are based upon the class identifier. For example, a particular class identifier may correspond to a specific plurality of KPIs and a corresponding plurality of values, for example 15, 20, or more KPIs and corresponding values. In other embodiments, the extraction engine 130 extracts the data as an array, list, or other suitable data structure. The order of the extracted data may be based on an order of its appearance in the scanned document, for example, moving left to right and then down across a page. The order of the extracted data may also be based upon its intended use by the verification engine 140 or workflow engine 150, described below. For example, the workflow engine 150 may analyze vehicle-specific fields (e.g., VIN, model year, model) before analyzing seller and lienholder information and thus the vehicle-specific fields are stored closer to a beginning of a data structure than the seller and lienholder information.

In some embodiments, the extraction engine 130 populates a single data structure for a payout settlement using multiple scanned documents that may be received at the same time, or over a period of time (e.g., several days, or until the payout settlement has been finalized). In other embodiments, the extraction engine 130 populates a separate data structure for each scanned document, for different sections of a scanned document, or various combinations of data structures (e.g., a vehicle data structure, an owner data structure).

In some embodiments, the neural network model 120 and the extraction engine 130 are implemented as a single engine. In other words, the neural network model 120 receives a scanned document from the scanning device 110 and outputs the class identifier and the extracted data. In other embodiments, the neural network model 120 outputs extracted data (e.g., strings, integers, etc.) and the extraction engine 130 places the extracted data into a suitable data structure.

The verification engine 140 is configured to verify the extracted data from the extraction engine 130 using existing data, for example, previously entered data that is stored in the data stores 160. In some embodiments, the verification engine 140 compares extracted data, such as a VIN field, with existing VIN fields within the data store 160 (e.g., within a customer database) to verify that the VIN field is for a vehicle whose owner is a customer. In other embodiments, the verification engine 140 compares an extracted signature from a vehicle owner with a stored signature within the data store 160 and determines whether the signatures match with suitable accuracy for further processing. When extracted data cannot be suitable verified, the verification engine 140 provides a notification to the workflow engine 150 for action by a user or title clerk.

In other embodiments, the verification engine 140 performs a data validation process on the extracted data. For example, the verification engine 140 may ensure that a zero and an "o" have not been incorrectly entered or recognized, that a date field has been populated with a valid date, that a VIN field has only letters and numbers, etc. In an embodiment, the verification engine 140 utilizes a Soundex process (or other suitable character/word verification algorithm) as part of the data validation process. For example, the verification engine 140 may compare Soundex values for integers, strings, or individual characters within a string with Soundex values for existing data. Soundex is a phonetic algorithm for indexing names by sound, as pronounced in English (or another language). The goal of Soundex is for homophones to be encoded to the same representation so that they can be matched despite minor differences in spelling or pronunciation. In an embodiment, the verification engine 140 automatically corrects extracted data using the existing data when a Soundex match is successful. As an example, where an owner name includes a number zero (e.g., "Sim0n"), the verification engine 140 may use the Soundex process to determine that the "0" should be a letter "o" and automatically correct the owner name to "Simon". As another example, the owner name as stored in the data store 160 may be "Ashcraft" while the extracted data may be "Ashcroft" and the verification engine 140 automatically corrects the extracted data to "Ashcraft" before further processing is performed.

The workflow engine 150 is configured to manage an overall process of handling a payout settlement or other business procedure, in various embodiments. For example, the workflow engine 150 may receive a first scanned document that initiates a request for a payout settlement from a vehicle owner where the settlement requires second and third documents to be processed. The workflow engine 150 is configured to associate scanned documents and extracted data with a particular vehicle, for example, by tagging the documents with an identifier that is unique to a vehicle (e.g., the VIN) or the settlement process.

The workflow engine 150 generates electronic documents based on the received documents and identifies next steps to be performed by a user (e.g., a title clerk) as needed. For example, the workflow engine 150 may generate and send a request for the second and third documents (e.g., verification of ownership, release of lien, etc.) to one or more third parties (e.g., an insurance company or lienholder). In some embodiments, the workflow engine 150 automatically determines which documents have not yet been received for a settlement process, which scanned documents have errors or omissions, etc. and generates suitable electronic documents or notifications for any issues to be resolved either by the system 100 directly, or a user of the system 100.

In some embodiments, the workflow engine 150 may generate notifications to a user that requests manual intervention in the settlement process, for example, to verify data, contact a third party by phone, handle exceptions that are not readily automated, etc. As one example, the workflow engine 150 may assign a task or provide a notification for a user to verify extracted data that was not found in the data store 160. As another example, the workflow engine 150 may assign a task to a user to manually process a scanned document that was unclassifiable by the neural network model 120.

The data stores 160 are configured to store data for the system 100. Examples of the data stores 160 may include personal computers, servers, network attached storage devices, database servers, distributed cloud storage systems, or other suitable storage devices. In some embodiments, the data stores 160 include a training document data store 162, a scanned document data store 164, and a vehicle information data store 166. The training document data store 162 stores source files such as Microsoft Word documents or PDF documents for the scanned documents (e.g., organized by state, local government, or jurisdiction), preprocessed image files of the electronic documents, training documents, processed image files (i.e., augmented training images), and other suitable data used for training the neural network model 120. The scanned document data store 164 stores the scanned documents from the scanning device 110, for example, original scanned documents, image files, preprocessed or augmented image files, etc. The vehicle information data store 166 stores extracted data and existing data, as discussed above (e.g., suitable data structures for the extracted data). Although the data stores 160 are shown as separate devices, in some embodiments, two or more of the data stores 160 are combined into a single device (e.g., within a server or distributed cloud system).

Figure 2:
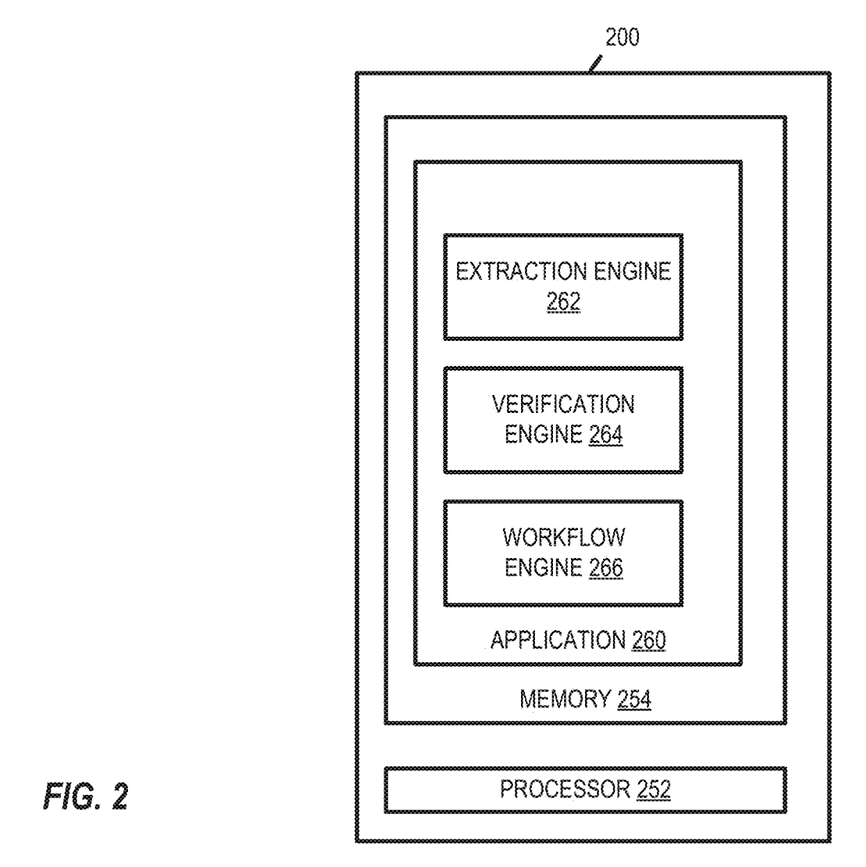
FIG. 2 is a block diagram of a computer system used with the document categorization and extraction system of FIG. 1, according to an embodiment.

FIG. 2 is a block diagram of a computer system 200 used with the document categorization and extraction system 100 of FIG. 1, according to an embodiment. In the embodiment of FIG. 2, the computer system 200 includes at least one processor 252 and a system memory 254. A number of program modules or applications 260 and data files may be stored in the system memory 254. While executing on the processor 252, the applications 260 may perform processes including, but not limited to, the aspects, as described herein. For example, the applications 260 may include an extraction engine 262, a verification engine 264, and a workflow engine 266 that generally correspond to the extraction engine 130, the verification engine 140, and the workflow engine 150. The memory 254 may also include one or more of the data stores 160, or portions thereof.

In some embodiments, multiple instances of the computer system 200 are utilized, for example, in different service locations of a settlement company that handles vehicle settlement payouts. In some such embodiments, the different computer systems 200 are communicatively coupled with the data stores 160 or other components of the system 100 via the network 170. The computer system 200 may provide one or more user interfaces, user input devices, displays, etc. that allow a user to view notifications and perform assigned tasks, as discussed above.

Figure 3A:
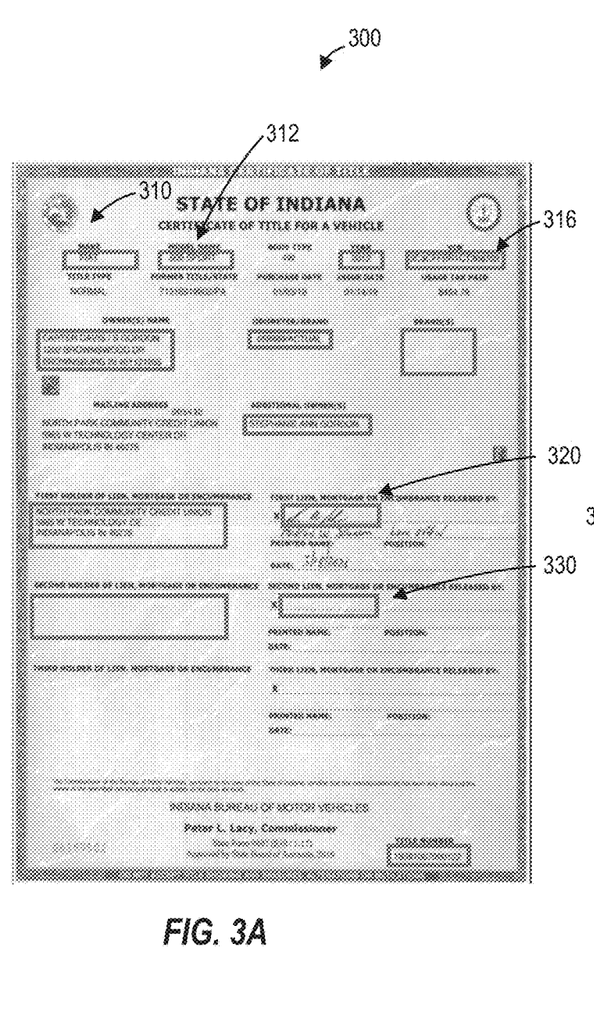
FIG. 3A and FIG. 3B are diagrams illustrating example training documents used with the document categorization and extraction system of FIG. 1, according to an embodiment.
Figure 3B:
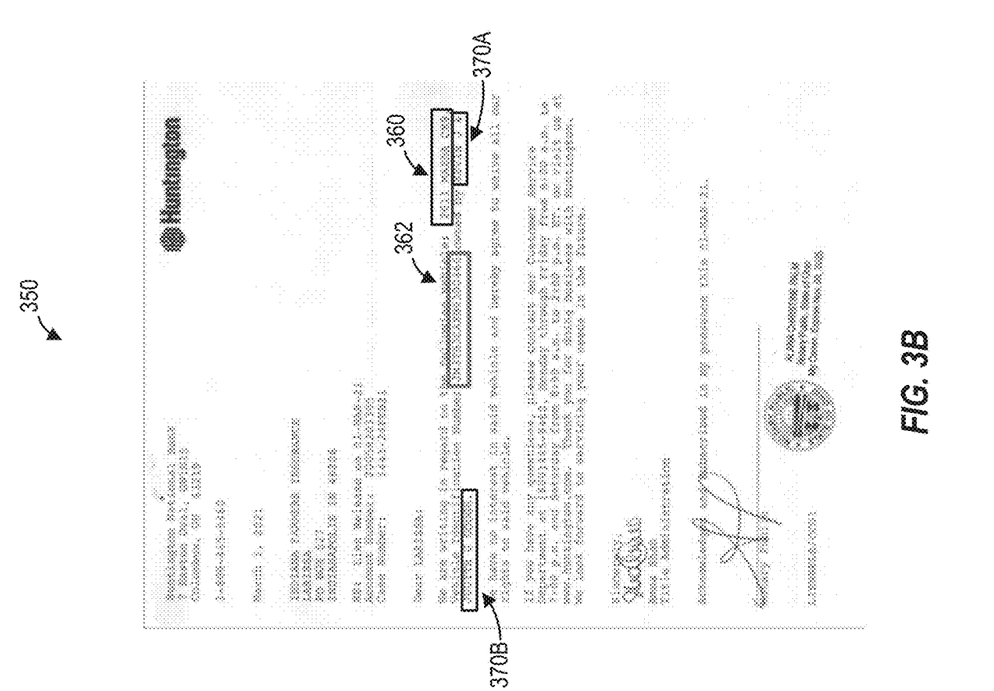

FIG. 3A and FIG. 3B are diagrams illustrating example training documents used with the system of FIG. 1, according to an embodiment. The training documents include a vehicle title document 300 (FIG. 3A) and a lien release document 350 (FIG. 3B). Although only two document types are shown, the neural network model 120 may be trained to identify, tens, hundreds, or thousands of document types, in various embodiments. The vehicle title document 300 includes a plurality of fields, including a vehicle make field 310, vehicle model name field 312, vehicle identification number (VIN) field 316, a first lien signature field 320, and a second lien signature field 330. As shown in FIG. 3A, some fields (i.e., second lien signature field 330) have not been completed and are blank.

The lien release document 350 includes a vehicle description field 360, a VIN field 362, and an owner field 370. Although the owner field 370 is spread over two lines as fields 370A and 370B, the extraction engine 130 is configured to identify the owner field 370 as a single field, instead of separate fields, for example, based on context within the lien release document 350.

Figure 4:
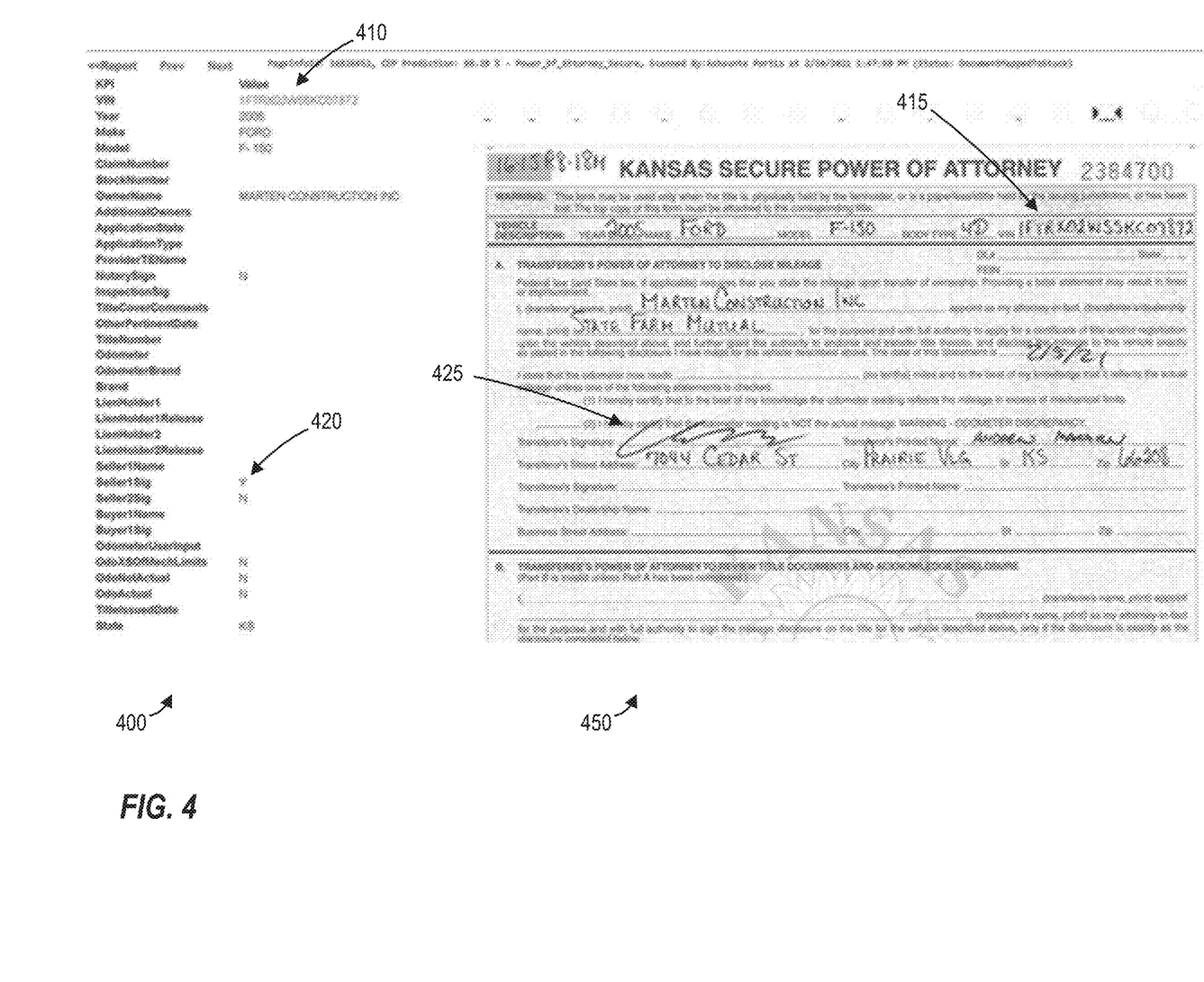
FIG. 4 is a diagram of an example scanned document and extracted data, according to an according to an embodiment.

FIG. 4 is a diagram of an example scanned document 450 and extracted data 400, according to an according to an embodiment. The scanned document 450 is a power of attorney type document based on a standardized form. The extracted data 400 is a list, array, or other suitable data structure that includes key pair identifiers (KPIs) and values.

For example, the scanned document 450 includes a vehicle identification number (VIN) at document field 415 and a seller's signature at document field 425. The extracted data includes a VIN field 410 populated with a string based on the document field 415, along with additional fields for the year, make, and model of the corresponding vehicle and an owner name. The extracted data also includes a seller signature field 420 with a value that is a binary identifier ("Y" or "N"), indicating whether the seller's signature is present ("Y") or not ("N") within the document field 425. In some embodiments, the extracted data also includes a binary object or other suitable representation of an image of the seller's signature.

Figure 5:
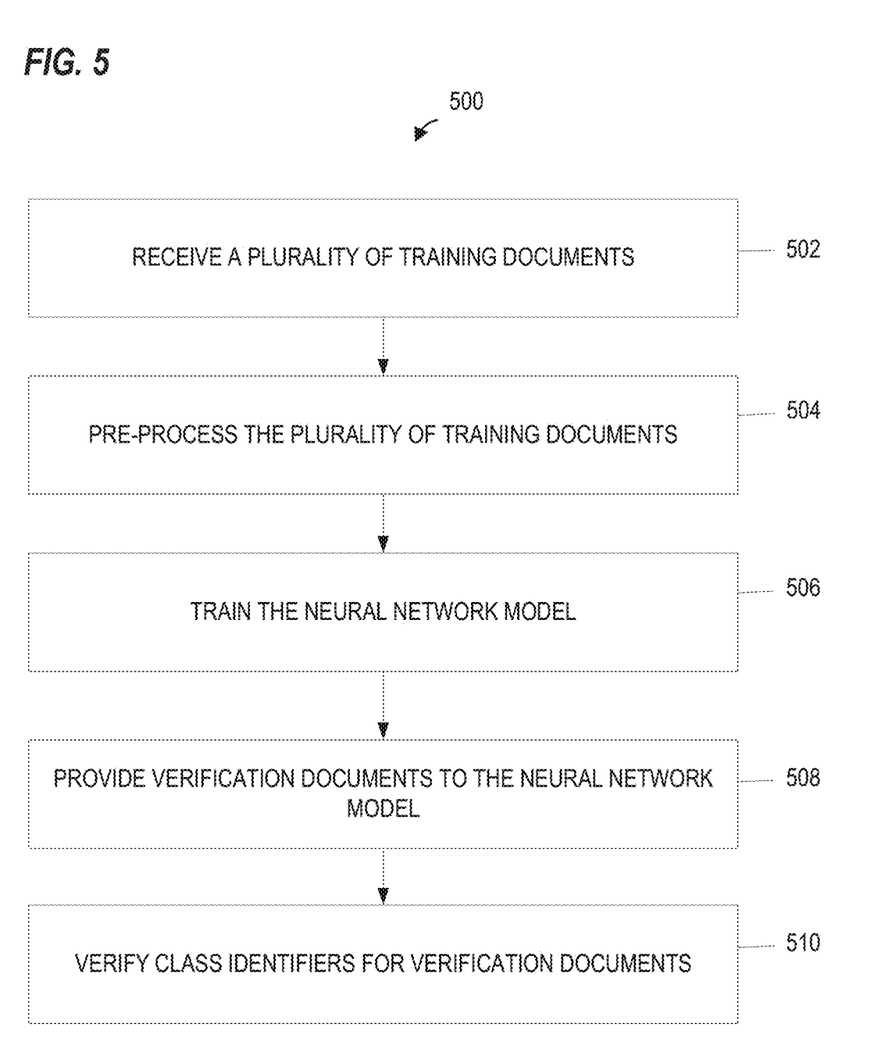
FIG. 5 is a flow chart of a method for training a neural network model, according to an embodiment.

FIG. 5 is a flow chart of a method 500 for training a neural network model, according to an embodiment. The method 500 may be performed to train the neural network model 120, for example. In some embodiments, the method 500 is performed by a processor associated with the neural network model 120. In other embodiments, the method 500 is performed by the processor 252 of the computer system 200, or another suitable processor.

At step 502, a plurality of training documents are received. Examples of the training documents include the documents 300, 350, and 450. In some embodiments, the method 500 is performed with a first plurality of training documents (e.g., 20, 30, 150 documents, or more) for a first document type, and performed again for a second plurality of training documents for a second document type. In some scenarios, the training documents are selected to be generally free from spots or other image artifacts, extra lines, etc.

At step 504, the plurality of training documents are pre-processed and/or augmented. In some embodiments, the scanning device 110 performs the pre-processing, as described above. In other embodiments, the neural network model 120 is configured to perform at least some of the pre-processing. In some embodiments, a user augments the training documents to include bounding boxes, labels, and/or other suitable identifiers that indicate locations within the training document from which data should be extracted. In other embodiments, the neural network model 120 is trained using both training documents and data from within the training documents that has been previously verified as accurate.

At step 506, the neural network module 120 is trained to classify scanned documents having, for example, a first document type according to a first class identifier, using the first plurality of training documents. As described above, step 506 may be performed several times for different document types, for example, a first time with 150 document samples of a lienholder release, a second time with 150 document samples of a power of attorney, etc.

At step 508, verification documents having known document types are provided to the neural network module 120 and class identifiers are received for each of the verification documents.

At step 510, the class identifiers are verified against the known document types of the verification documents to ensure that the neural network model accurately identifies the document types. In some embodiments, after verification, the neural network model 120, extraction engine 130, and verification engine 140 are updated based on the verification, for example, to update field names, values, or handling processes.

In some embodiments, the method 500 also includes storing at least some of a plurality of scanned documents that are unclassifiable by the neural network model 120. The unclassifiable documents may be stored as a second plurality of training documents, for example. The neural network model 120 is then retrained to classify scanned documents using the first plurality of training documents (e.g., original training documents) and the second plurality of training documents (e.g., unclassifiable documents). In some embodiments, the second plurality of training documents are modified to include labels of data to be extracted before retraining the neural network model 120. In an embodiment, when unclassifiable documents are identified, the workflow engine 150 or other component of the system 100 flags the unclassifiable documents to be manually processed (e.g., by the title clerk) before the retraining of the neural network model 120.

Figure 6:
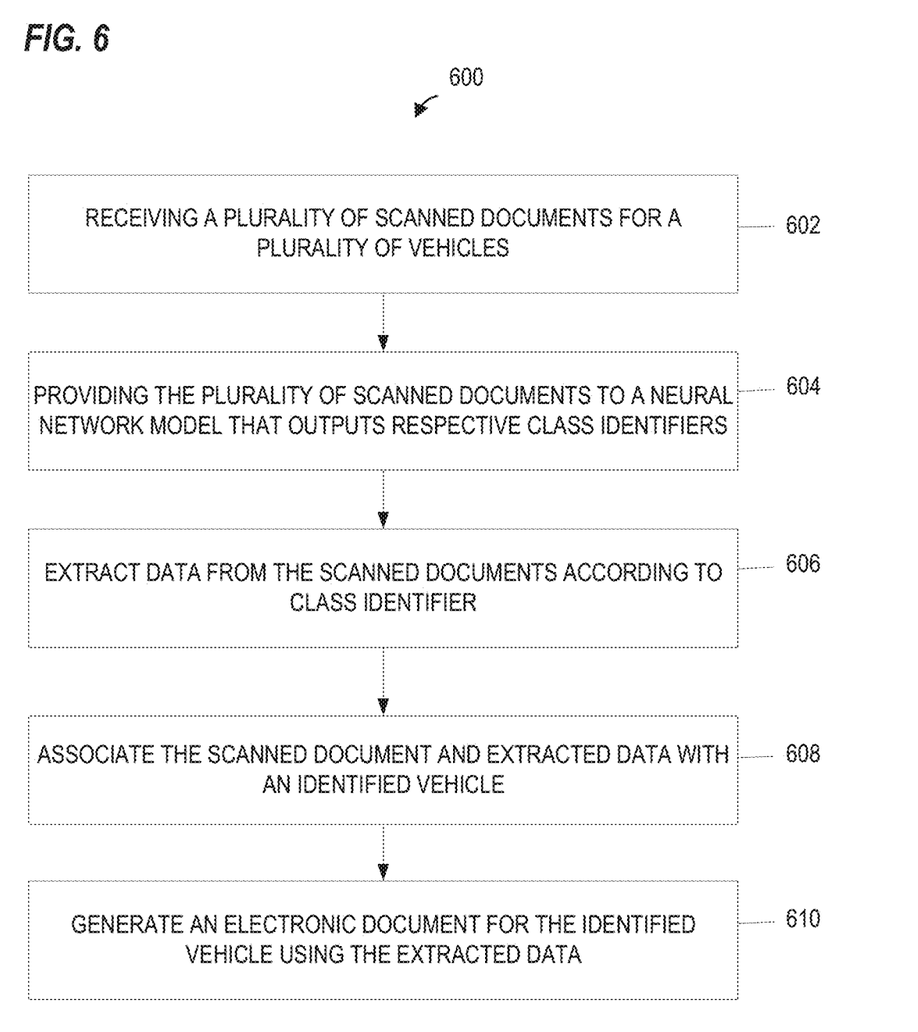
FIG. 6 is a flow chart of a method for generating electronic documents, according to an embodiment.

FIG. 6 is a diagram illustrating a process 600 implemented by the system 100 to generate electronic documents, according to an embodiment. In an embodiment, the computing device 250 implements the process 600. In another embodiment, another suitable component of the system 100 implements one or more steps of the process 600.

At block 602, a plurality of scanned documents are received for a plurality of vehicles. In an embodiment, the plurality of scanned documents are received from the scanning device 110, for example.

At block 604, the plurality of scanned documents are provided to a neural network model that outputs respective class identifiers of the plurality of scanned documents. The neural network model generally corresponds to the neural network model 120, in some embodiments.

Blocks 606 and 608 are performed for each scanned document of the plurality of scanned documents. At block 606, data is extracted from the scanned document according to a corresponding class identifier. In some embodiments, the data is extracted using the extraction engine 130, for example.

At block 608, the scanned document and the extracted data are associated with an identified vehicle of the plurality of vehicles. The identified vehicle is identified by the extracted data. In some embodiments, the workflow engine 150 associates the extracted data and the scanned documents with an identified vehicle. The vehicle is identified by the verification engine 140, in some embodiments.

At block 610, an electronic document is generated for the identified vehicle using the extracted data. In some embodiments, the electronic document is generated by the workflow engine 150, for example, to advance a settlement process as described above.

In some embodiments, the method 600 also includes modifying a first plurality of training documents having a first document type to include labels of data to be extracted. The neural network model is then trained to classify scanned documents having the first document type according to a first class identifier using the first plurality of training documents. In some embodiments, the first plurality of training documents are pre-processed, including converting the first plurality of training documents into images and using one or more image augmentation processes. For example, the scanning device 110 may perform the image augmentation processes described above. The image augmentation processes may include a realignment process that corrects an angular orientation of an image. The image augmentation processes may also include a noise reduction process that corrects noise within an image, or other suitable augmentation process.

In some embodiments, the method 600 may also include storing at least some of the plurality of scanned documents that are unclassifiable by the neural network model as a second plurality of training documents. The neural network model is then retrained to classify scanned documents using the first plurality of training documents and the second plurality of training documents. In some embodiments, the second plurality of training documents is modified to include labels of data to be extracted before retraining the neural network model. In an embodiment, the unclassifiable documents are flagged to be manually processed before the retraining of the neural network model. For example, the workflow engine 150 may flag the unclassifiable documents, as described above.

The method 600 may further include, in some embodiments, verifying the extracted data by comparing the extracted data with existing data associated with the identified vehicle in a data store. The extracted data may be stored in the data store (e.g., data store 160) when verification is successful and the extracted data may be flagged to be manually processed when verification is unsuccessful. In an embodiment, a Soundex match is performed between the extracted data and the existing data, by the verification engine 140 as discussed above. Moreover, the verification engine 140 may automatically correct the extracted data using the existing data when the Soundex match is successful.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 1 or FIG. 2 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computer system 200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A computer-implemented method of generating electronic documents, the method comprising:
   receiving at least one scanned document relating to one of a plurality of vehicles;
   providing the at least one scanned document to a neural network model that outputs a class identifier for the at least one scanned document;
   extracting data from the scanned document according to the class identifier, and associating the scanned document and the extracted data with an identified vehicle of the plurality of vehicles, wherein the identified vehicle is identified by the extracted data; and
   generating an electronic document for the identified vehicle using the extracted data.

2. The computer-implemented method of claim 1, further comprising:
   modifying a first plurality of training documents having a first document type to include labels of data to be extracted;

training the neural network model to classify scanned documents having the first document type according to a first class identifier using the first plurality of training documents.

3. The computer-implemented method of claim 2, further comprising:
pre-processing the first plurality of training documents, including converting the first plurality of training documents into images and using one or more image augmentation processes.

4. The computer-implemented method of claim 3, wherein the one or more image augmentation processes include a realignment process that corrects an angular orientation of an image.

5. The computer-implemented method of claim 3, wherein the one or more image augmentation processes include a noise reduction process that corrects noise within an image.

6. The computer-implemented method of claim 2, further comprising:
storing at least some of the plurality of scanned documents that are unclassifiable by the neural network model as a second plurality of training documents; and
retraining the neural network model to classify scanned documents using the first plurality of training documents and the second plurality of training documents.

7. The computer-implemented method of claim 6, further comprising modifying the second plurality of training documents to include labels of data to be extracted before retraining the neural network model.

8. The computer-implemented method of claim 6, further comprising flagging the unclassifiable documents to be manually processed before the retraining of the neural network model.

9. The computer-implemented method of claim 1, further comprising:
verifying the extracted data by comparing the extracted data with existing data associated with the identified vehicle in a data store;
storing the extracted data in the data store when verification is successful; and
flagging the extracted data to be manually processed when verification is unsuccessful.

10. The computer-implemented method of claim 9, wherein verifying the extracted data includes performing a Soundex match between the extracted data and the existing data.

11. The computer-implemented method of claim 10, further including automatically correcting the extracted data using the existing data when the Soundex match is successful.

* * * * *